3,125,566
PROCESS FOR OBTAINING NOVOBIOCIN
Frank J. Wolf, Westfield, N.J., assignor to Merck & Co., Inc., Rahway, N.J., a corporation of New Jersey
No Drawing. Filed Nov. 30, 1955, Ser. No. 550,200
10 Claims. (Cl. 260—210)

This invention relates, generally, to processes and methods for obtaining the new and useful antibiotic, novobiocin, from its crude solutions; and, more particularly, it is concerned with certain improved processes and methods for recovering and concentrating this antibiotic from crude solutions containing substances having novobiocin-activity, including fermentation broths, crude concentrates, dilute solutions, extracts, and the like.

Novobiocin is an antibiotic substance, possessing a broad antibacterial spectrum and being particularly active against gram-positive microorganisms, formed during aerobic cultivation, in a suitable aqueous nutrient medium and under controlled conditions, of the recently discovered microorganism *Streptomyces spheroides*. A viable culture of this novobiocin-producing organism has been deposited in and added to the permanent culture collection of the United States Department of Agriculture, Northern Regional Utilization Research Branch at Peoria, Illinois, identified as NRRL 2449. It will be understood that novobiocin may be produced, also, by mutants of this organism such as may be obtained by natural selection, or by use of a mutating agent such as ultraviolet or X-ray irradiation, nitrogen mustards, and the like.

This new antibiotic is comprised of the elements carbon, hydrogen, nitrogen, and oxygen, combined in a substance having approximately the empirical formula $C_{30-32}H_{34-40}N_2O_{10-12}$. It reacts as an acidic organic compound toward and is easily soluble in alkaline reagents, such as aqueous solutions of alkali-metal hydroxides, carbonates, and bicarbonates; it has two base-binding groups and can be precipitated from its solution in alkalis by acidification. It is soluble in the lower alkanols, lower aliphatic ketones, acetic acid and dioxane; it is insoluble or merely sparingly soluble in ether, benzene, ethyl acetate, chloroform, carbon tetrachloride, ethylene dichloride, water, and hydrochloric acid.

Substantially pure novobiocin has been obtained in two yellow crystalline modifications: a form crystallizing as rosettes and melting at about 152°–154° C., and another form having the apperance of flat needles, melting at about 170°–172° C. Each of these crystalline forms of the antibiotic can be converted into a normalized form, which may be an amorphous or submicrocrystalline form, by dissolving the crystals in acetone, quickly adding to this solution a relatively large volume of petroleum ether, and recovering the precipitated normalized material by filtration.

Alkaline aqueous solutions of novobiocin and mineral oil suspensions of the normalized form of the antibiotic exhibit characteristic absorption, the former in the ultraviolet and the latter in the infrared portions of the radiation spectrum. A solution of substantially pure novobiocin in 0.1 N aqueous sodium hydroxide exhibits a characteristic ultraviolet absorption peak at 3070 A. This absorption peak is indicative of a substantially pure material having a specific absorbancy of 600, measured at this wavelength, using a solution containing one gram of pure novobiocin per hundred milliliters of the solution, contained in a cell having an absorption path of one centimeter. A solution of pure novobiocin in 0.1 N aqueous-methanolic hydrochloric acid exhibits a characteristic ultraviolet absorption peak at 3240 A.

$$(E^{1\%}_{1\,cm.}\ 390)$$

A mineral oil suspension of a substantially pure normalized novobiocin exhibits characteristic infrared absorption peaks at the following wavelengths, expressed in microns; 5.8–6.0 (broad), 6.10, 6.21, 6.30, 6.49, 6.63, 7.4–7.6 (broad-shoulder), 7.78, 7.96, 8.27 (weak), 8.60 (shoulder), 8.7 (shoulder), 9.13, 9.40, 10.0–10.1 (broad), 10.28, 10.60 (broad), 12.0–12.30 (broad), 12.60–12.75 (broad), 13.07, and 13.39.

Substantially pure crystalline novobiocin has a microbiological activity of about 4000 units to 5000 units per milligram, as determined by standard cup-plate diffusion methods, using *Bacillus mogatherium* ATCC 9885 as the test organism. It is optically active, $[\alpha]_D^{25}=-27°$ (c., 1 in 1 N sodium hydroxide) and $[\alpha]_D^{25}=-44°$ (c., 1 in pyridine).

Novobiocin is active in inhibiting growth of gram-positive microorganisms primarily, although it also exhibits some activity against gram-negative microorganisms. It inhibits growth of the following organisms, inter alia:

*M. pyogenes* var. *albus*
*M. pyogenes* var. *aureus*
*Diplococcus pneumoniae*
*Corynebacterium diphtheriae* type *gravis*
*Corynebacterium diphtheriae* type *intermedius*
*Corynebacterium diphtheriae* type *mitis*
*Corynebacterium xerose*
*Corynebacterium renale*
*Neisseria meningitidis*
*Sarcina lutea* (VD)
*M. pyogenes* var. *aureus* resistant to aureomycin
*M. pyogenes* var. *aureus* resistant to streptomycin-streptothricin
*M. pyogenes* var. *aureus* resistant to penicillin.

Aqueous media that are suitable for aerobic cultivation of strains of *Streptomyces spheroides* to produce novobiocin are, generally stated, those suitable for the production of other antibiotics by cultivation of other Streptomyces organisms. Such media contain sources of assimilable carbon, such as a carbohydrate; of assimilable nitrogen, such as corn steep liquor, casein hydrolysate, distiller's solubles, or the like; and inorganic salts, including trace metals, required for proper metabolism of the microorganism. Preferably, the medium is maintained at a temperature of 24°–28° C. during the period, usually about one to seven days, which the microorganism is cultivated, and aeration is provided for optimum growth of the organism and production of novobiocin. Fermented broths produced in this manner have an activity of about 150–2000 units per milliliter, and the fermentation broth solids have an activity of the order of about 5–10 units per milligram of solids. The antibioactive material can be purified and recovered in purer form by any of several procedures.

One such procedure is substantially as follows: The whole fermentation broth is filtered after adjusting the hydrogen ion concentration to pH 9.0, and to the filtrate, a diatomaceous earth filter aid is added, then the mixture is slowly acidified by addition of mineral acid until the hydrogen ion concentration is pH 2.0. After filtration, the cake is washed with water, extracted at pH 9.0 with aqueous methanol (85%), and the extract is concentrated by evaporation of the methanol. The hydrogen ion concentration of the aqueous solution is adjusted to about pH 9.0, then it is extracted with n-butanol.

The butanol extract is concentrated to a tenth of its original volume, added to fifteen times its volume of water at pH 9.0, a filter aid is added and the pH is slowly adjusted to 2.0 by addition of acid. The mixture is filtered, the residual cake is dried in vacuo, then it is milled and triturated with petroleum ether until no further colored material dissolves. The mixture is filtered, the cake is extracted with ethanol, and this solution of the bioactive material is subjected to chromatographic purification on an acid-washed alumina column. Impurities present in the ethanol extract are removed by adsorption on the alumina. Residual active material is removed from the column by washing with ethanol, the combined washings and effluent is concentrated to about 5% solids, diluted with slightly more than an equal volume of water and the antibiotic is allowed to crystallize. The product thus obtained has an activity of 2500 to 3000 units per milligram. By forming an acetone solution of this product, treating it with activated charcoal, removing the charcoal and adding petroleum ether to turbidity, a crystalline product is obtained having an activity of 4500–5000 units per milligram.

It will be evident that this process for obtaining novobiocin comprises many steps, including repeated extractions by various preferential solvents, concentration of solutions and the handling of progressively more potent forms of the active material; the process, thus, has the disadvantage of being time consuming, requiring a large amount of skilled labor and attention from scientifically trained personnel.

One of the objects of this invention is to provide methods and processes for obtaining novobiocin in a state of high purity and biological activity that, by comparison to the process above described, are more direct, require less handling of the active material, and that require a much briefer period of time to complete processing of a batch of material to the final pure product.

Another of the objects of this invention is to provide a method for obtaining substantially pure novobiocin by direct treatment of crude concentrates containing the same, whereby essentially pure material is obtainable in crystalline form.

A further object of this invention is to provide a process for effective and rapid concentration of the antibiotic, novobiocin, from dilute aqueous solutions containing the same, and, particularly, from fermentation broths and the like prior or subsequent to filtration thereof.

Another object of this invention is to provide a process for obtaining by continuous organic solvent-extraction methods, essentially complete recovery of novobiocin from dilute aqueous novobiocin-bearing solutions.

Other objects of this invention will be apparent hereinafter during the description of specific features of the process.

According to certain broad aspects of this invention, novobiocin is obtained and recovered from crude fermentation broths, prior to or after filtration, or other aqueous novobiocin-bearing solutions, by extraction of the solutin under acidic conditions with an organic extracting solvent as hereinafter defined, preferably a lower alkanol ester of a lower alkanoic acid, followed by back extraction into an alkaline aqueous buffer solution, from which the antibiotic may be recovered.

According to certain more limited aspects, the process or methods of this invention comprise extraction of crude dilute novobiocin-bearing solutions with an organic solvent, as hereinafter defined, at a hydrogen-ion concentration of below about pH 7.0, preferably, about pH 6.5; back extraction of this organic extract with an aqueous buffer solution, preferably containing a low molecular weight, water-miscible, polar organic solvent such as methanol, N,N-dimethyl-formamide or ethylene glycol, at a hydrogen-ion concentration of at least pH 8.5 and preferably about pH 10.0. Substantially pure crystalline novobiocin may be obtained by concentration of this aqueous buffer extract and addition thereto of a lower alkanol and a lower alkanoic acid, specifically, methanol and acetic acid, respectively.

The selection of the organic solvent to be utilized in the foregoing extraction is a critical limitation upon the process of this invention. To be suitable for this use, this solvent must be a merely slightly polar, neutral, water-immiscible substance, soluble in cold concentrated orthophosphoric acid, and in cold concentrated sulfuric acid, liquid at ordinary room temperatures, and selected from the group consisting of esters, ketones and alkanols higher than butanol in the homologous alkanol series. Among the substances that have been found to be satisfactory for use in this extracted operation are amyl acetate, which is chiefly preferred, methyl isobutyl ketone, ethyl acetate, isoamyl alcohol, and n-butyl acetate.

To assure a more complete understanding of the subject matter of this invention and of how the methods and processes in accordance therewith best may be practiced, certain presently preferred specific embodiments of this invention will now be described, it being clearly understood that these specific examples are provided by way of illustration, merely, and not by way of limitation upon the invention defined in the subjoined claims.

*Example 1*

A novobiocin-producing strain of *Streptomyces spheroids* (NRRL aqueous 2449) is cutivated by submerged aerobic fermentation in a suitable nutrient medium for a period and under conditions such that the desired production of novobiocin in the fermentation broth occurs. A filtering aid, such as diatomaceous earth or the like, is added to the whole broth, at the hydrogen-ion concentration of harvest, usually about pH 7.0–8.0 then it is filtered and the cake is washed with warm water. The volume of the combined filtrate and washings is about one-fifth larger than that of the broth before filtration.

The broth is extracted in a suitable countercurrent extraction apparatus, with a volume of amyl acetate equal to a tenth of the volume of the filtered broth; the extraction is repeated with another like volume of amyl acetate; and the extracts are combined. It is important that the hydrogen-ion concentration of the aqueous phase, during this extraction operation, be adjusted to about pH 6.5 by addition of a suitable mineral acid, such as sulfuric acid.

The next step in the process utilizes an aqueous extracting solvent, referred to herein for convenience merely, as an alkaline buffer solution, which may be prepared as follows: about 10 grams of sodium carbonate and 8 grams of sodium bicarbonate are dissolved in 950 milliliters of water, and 50 milliliters of methanol is added to make a total volume of one liter of solution. The combined amyl acetate extracts, in a suitable countercurrent extraction apparatus, are extracted with this alkaline buffer solution, using the latter in the proportion of one-fifth the volume of the former, and the extraction is repeated once with a like volume of aqueous extracting solvent. It is very important that the hydrogen-ion concentration of the aqueous phase, during this extraction operation, be maintained at or near pH 10, and no lower than pH 9.5, more alkali being added for this purpose, if required.

The aqueous buffer extracts obtained in this manner are combined and concentrated by evaporation, which serves also to remove dissolved amyl acetate, and a mineral acid, such as hydrochloric acid, is added until the hydrogen-ion concentration reaches pH 2.3–2.6. This causes decomposition of the sodium salt of novobiocin in the solution and precipitation of novobiocin from the buffer, and this precipitate is recovered by filtration.

The filtration residue is weighed and dissolved in sufficient methanol to provide a solution containing about 10% by weight of solid, then sufficient water and acetic acid are added that, in the final solution, the proportions by volume of methanol, water, and acetic acid are 10:4:1. Pure, crystalline novobiocin separates from the solution and is recovered by filtration; the crystals are washed with a mixture of ten parts by volume of methanol and four parts by volume of water, then dried under vacuum at temperatures below about 45° C.

*Example 2*

The procedure described in Example 1 is repeated with the following sole modification: the alkaline buffer solution used is aqueous ammonium hydroxide solution containing 5% by volume of methanol. The concentration of ammonium hydroxide in this solution is so adjusted that, after extraction of the amyl acetate solution, the hydrogen-ion concentration of the aqueous extract is not lower than about pH 9.5. The crystalline novobiocin obtained in this manner is identical with that obtained as described in Example 1.

*Example 3*

The procedure described in Example 2 is repeated through the step of extracting the amyl acetate solution with alkaline buffer solution, then this extract is further treated as follows: The combined aqueous ammoniacal methanolic extracts are extracted with amyl acetate in a two-stage countercurrent operation, using a volume of amyl acetate in each stage approximately equal to one-tenth the volume of the aqueous solution being extracted, and at a controlled hydrogen-ion concentration of pH 6.5. The amyl acetate extracts obtained in this manner are combined and, in turn, subjected to a two-stage countercurrent extraction, using aqueous ammonium hydroxide solution containing 30% by volume of methanol and controlling the hydrogen-ion concentration during the extraction whereby it is maintained at pH 9.5. The volume of aqueous extracting solvent used in each stage of this extraction operation is approximately equal to one-fifth the volume of the combined amyl acetate extracts. Methanol and acetic acid are added to the combined aqueous extracts to produce a mixture containing methanol, water, and acetic acid in the proportions by volume of 10:4:1, whereby pure crystalline novobiocin separates as a precipitate and is recovered. This product is identical with those obtained as described in the preceding examples.

*Example 4*

The procedure described in Example 1 is repeated using the whole fermentation broth, without filtration, as the starting material. In this instance, the hydrogen-ion concentration of the whole broth, which at time of harvest is about pH 7.0–8.0, is adjusted to about pH 6.5, then it is extracted and otherwise processed as described in the above-mentioned example. The crystalline novobiocin so obtained is identical with the products obtained by the methods described in the preceding examples.

*Example 5*

A mildly alkaline solution of novobiocin is extracted, in a suitable extraction apparatus, with a volume of ethyl acetate approximately equal to a tenth of the volume of the solution, then the extraction is repeated with another like volume of ethyl acetate and the extracts are combined. It is important that the hydrogen-ion concentration of the aqueous phase, during this extraction operation, be adjusted to and maintained at about pH 6.5 by addition thereto of a suitable acid, such as sulfuric acid or another of the common mineral acids.

The next step of the process utilizes an aqueous extracting solvent, hereinafter referred to as an alkaline buffer solution, which consists of an aqueous solution of ammonium hydroxide containing 5% by volume of methanol. The combined ethyl acetate extracts, in a suitable extraction apparatus, are extracted with this alkaline buffer solution, using the latter in the proportion of one-fifth of the volume of the former, and the extraction is repeated once with a like volume of the aqueous extracting solvent. It is very important that the hydrogen-ion concentration of the aqueous phase be maintained at about pH 10.0, and no lower than pH 9.5, during this extraction operation, more ammonium hydroxide being added for this purpose, if necessary.

The combined aqueous ammoniacal methanolic extracts are extracted with ethyl acetate in a two-stage extraction, using, in each stage, a volume of ethyl acetate approximately equal to one-tenth the volume of the aqueous solution being extracted. During this extraction operation, the hydrogen-ion concentration of the aqueous phase is adjusted to and maintained at about pH 6.5. The ethyl acetate extracts obtained in this manner are combined and, in turn, subjected to a two-stage extraction, using aqueous ammonium hydroxide solution containing about 30% by volume of methanol and controlling the hydrogen-ion concentration of the aqueous phase during the extraction whereby it is maintained at pH 9.5. The volume of aqueous extracting solvent used in each stage of this extraction operation is approximately equal to one-fifth the volume of the combined ethyl acetate extracts. Methanol and acetic acid are added to the combined aqueous fractions to produce a mixture containing methanol, water and acetic acid in the proportions by volume of 10:4:1, whereby pure crystalline novobiocin separates as a precipitate and is recovered. This product is identical with those described in the preceding examples.

*Example 6*

A mildly alkaline solution of novobiocin is extracted, in a suitable extraction apparatus, with a volume of methyl isobutyl ketone approximately equal to a tenth of the volume of the solution, then the extraction is repeated with another like volume of methyl isobutyl ketone and the extracts are combined. It is important that the hydrogen-ion concentration of the aqueous phase, during this extraction operation, be adjusted to and maintained at about 6.5 by addition thereto of a suitable acid, such as sulfuric acid or another of the common mineral acids.

The next step of the process utilizes an aqueous extracting solvent, hereinafter referred to as an alkaline buffer solution, which consists of an aqueous solution of ammonium hydroxide containing 5% by volume of methanol. The combined methyl isobutyl ketone extracts, in a suitable extraction apparatus, are extracted with this alkaline buffer solution, using the latter in the proportion of one-fifth of the volume of the former, and the extraction is repeated once with a like volume of the aqueous extracting solvent. It is very important that the hydrogen-ion concentration of the aqueous phase be maintained at about pH 10.0, and no lower than pH 9.5, during this extraction operation, more ammonium hydroxide being added for this purpose, if necessary.

The combined aqueous ammoniacal methanolic extracts are extracted with methyl isobutyl ketone in a two-stage extraction, using, in each stage, a volume of the ketone approximately equal to one-tenth the volume of the aqueous solution being extracted. During this extraction operation, the hydrogen-ion concentration of the aqueous phase is adjusted to and maintained at about pH 6.5. The methyl isobutyl ketone extracts obtained in this manner are combined and, in turn, subjected to a two-stage extraction, using aqueous ammonium hydroxide solution containing about 30% by volume of methanol and controlling the hydrogen-ion concentration of the aqueous phase during the extraction whereby it is maintained at pH 9.5. The volume of aqueous extracting solvent used in each stage of this extraction operation is approximately equal to one-fifth the volume of the combined methyl isobutyl ketone extracts. Methanol and acetic acid are added to the combined aqueous fractions to produce a mixture containing methanol, water and acetic acid in the proportions by volume of 10:4:1, whereby pure crystalline novobiocin separates as a precipitate and is recovered. This product is identical with those described in the preceding examples.

*Example 7*

A mildly alkaline solution of novobiocin is extracted, in a suitable extraction apparatus, with a volume of isoamyl alcohol approximately equal to a tenth of the volume of the solution, then the extraction is repeated with another like volume of isoamyl alcohol and the extracts are combined. It is important that the hydrogen-ion concentration of the aqueous phase, during this extraction operation, be adjusted to and maintained at about pH 6.5 by addition thereto of a suitable acid, such as sulfuric acid or another of the common mineral acids.

The next step of the process utilizes an aqeous extracting solvent, hereinafter referred to as an alkaline buffer solution, which consists of an aqueous solution of ammonium hydroxide containing 5% by volume of methanol. The combined isoamyl alcohol extracts, in a suitable extraction apparatus, are extracted with this alkaline buffer solution, using the latter in the proportion of one-fifth of the volume of the former, and the extraction is repeated once with a like volume of the aqueous extracting solvent. It is very important that the hydrogen-ion concentration of the aqueous phase be maintained at about pH 10.0, and no lower than pH 9.5, during this extraction operation, more ammonium hydroxide being added for this purpose, if necessary.

The combined aqueous ammoniacal methanolic extracts are extracted with isoamyl alcohol in a two-stage extraction, using, in each stage, a volume of the alcohol approximately equal to one-tenth the volume of the aqueous solution being extracted. During this extraction operation, the hydrogen-ion concentration of the aqueous phase is adjusted to and maintained at about pH 6.5. The isoamyl alcohol extracts obtained in this manner are combined and, in turn, subjected to a two-stage extraction, using aqueous ammonium hydroxide solution containing about 30% by volume of methanol and controlling the hydrogen-ion concentration of the aqueous phase during the extraction whereby it is maintained at pH 9.5. The volume of aqueous extracting solvent used in each stage of this extraction operation is approximately equal to one-fifth the volume of the combined isoamyl alcohol extracts. Methanol and acetic acid are added to the combined aqueous fractions to produce a mixture containing methanol, water and acetic acid in the proportions by volume of 10:4:1, whereby pure crystalline novobiocin separates as a precipitate and is recovered. This product is identical with those described in the preceding examples.

*Example 8*

A mildly alkaline solution of novobiocin is extracted, in a suitable extraction apparatus, with a volume of n-butyl acetate approximately equal to a tenth of the volume of the solution, then the extraction is repeated with another like volume of n-butyl acetate and the extracts are combined. It is important that the hydrogen-ion concentration of the aqueous phase, during this extraction operation, be adjusted to and maintained at about pH 6.5 by addition thereto of a suitable acid, such as sulfuric acid or another of the common mineral acids.

The next step of the process utilizes an aqueous extracting solvent, hereinafter referred to as an alkaline buffer solution, which consists of an aqueous solution of ammonium hydroxide containing 5% by volume of methanol. The combined n-butyl acetate extracts, in a suitable extraction apparatus, are extracted with this alkaline buffer solution, using the latter in the proportion of one-fifth of the volume of the former, and the extraction is repeated once with a like volume of the aqueous extracting solvent. It is very important that the hydrogen-ion concentration of the aqueous phase be maintained at about pH 10.0, and no lower than pH 9.5, during this extraction operation, more ammonium hydroxide being added for this purpose, if necessary.

The combined aqueous ammoniacal methanolic extracts are extracted with n-butyl acetate in a two-stage extraction, using, in each stage, a volume of the ester approximately equal to one-tenth the volume of the aqueous solution being extracted. During this extraction operation, the hydrogen-ion concentration of the aqueous phase is adjusted to and maintained at about pH 6.5. The n-butyl acetate extracts obtained in this manner are combined and, in turn, subjected to a two-stage extraction, using aqueous ammonium hydroxide solution containing about 30% by volume of methanol and controlling the hydrogen-ion concentration of the aqueous phase during the extraction whereby it is maintained at pH 9.5. The volume of aqueous extracting solvent used in each stage of this extraction operation is approximately equal to one-fifth the volume of the combined n-butyl acetate extracts. Methanol and acetic acid are added to the combined aqueous fractions to produce a mixture containing methanol, water and acetic acid in the proportions by volume of 10:4:1, whereby pure crystalline novobiocin separates as a precipitate and is recovered. This product is identical with those described in the preceding examples.

What is claimed is:

1. In a process for obtaining novobiocin from aqueous solutions containing the same, the steps that comprise subjecting the said aqueous solution to extraction with an organic extracting solvent at a hydrogen-ion concentration within the acid range below about pH 7.0, said organic solvent being a merely slightly polar, neutral, water-immiscible substance, soluble in cold concentrated sulfuric acid and in cold concentrated ortho-phosphoric acid, liquid at ordinary room temperatures and selected from the group consisting of esters, ketones and alkanols higher than butanol in the homologous alkanol series; and subjecting the organic solvent extract to extraction with an aqueous buffer solution having a pH of at least 8.5.

2. Process as defined in claim 1 wherein the organic extracting solvent is amyl acetate.

3. Process as defined in claim 1 wherein the organic extracting solvent is methyl isobutyl ketone.

4. Process as defined in claim 1 wherein the organic extracting solvent is ethyl acetate.

5. Process as defined in claim 1 wherein the organic extracting solvent is isoamyl alcohol.

6. Process as defined in claim 1 wherein the organic extracting solvent is n-butyl acetate.

7. Process as defined in claim 1 wherein the aqueous buffer solution contains a low molecular weight, water-miscible, polar organic solvent chosen from the group consisting of methanol, N,N-dimethyl-formamide and ethylene glycol.

8. In a process for obtaining novobiocin from aqueous solutions containing the same, the steps that comprise subjecting the said aqueous solution to extraction with amyl acetate at a hydrogen-ion concentration within the acid range below about pH 7.0; and subjecting the amyl acetate extract to extraction with an aqueous ammonium hydroxide buffer solution containing a low molecular weight, water-miscible, polar organic solvent at a pH of at least 8.5.

9. Process as defined in claim 8 wherein the extraction of the aqueous solution with amyl acetate is performed at a hydrogen-ion concentration of pH 6.5; the extraction of the amyl acetate with aqueous ammonium hydroxide buffer solution is performed at a hydrogen-ion concentration of about pH 9.5; and the low molecular weight, water-miscible, polar organic solvent is methanol.

10. In a process for obtaining novobiocin from aqueous solutions containig the same, the steps that comprise subjecting the said aqueous solution to extraction with an organic extracting solvent at a hydrogen-ion concentration within the acid range below about pH 7.0, said organic solvent being a water-immiscible substance selected from the group consisting of lower fatty acid esters, lower ketones, and lower alkanols higher than butanol in the homologous alkanol series; and subjecting the organic solvent extract to extraction with an aqueous buffer solution having a pH of at least 8.5.

References Cited in the file of this patent

UNITED STATES PATENTS

| | | |
|---|---|---|
| 2,481,763 | Lineweaver | Sept. 13, 1949 |
| 2,516,080 | Sobin | July 18, 1950 |
| 2,653,899 | Bunch | Sept. 29, 1953 |
| 2,667,441 | Nager | Jan. 26, 1954 |

OTHER REFERENCES

Holiday: "The British Journal of Experimental Pathology," vol. XXXIII, June 1942, pages 103 to 114 relied on.

Reynolds: Proc. Soc. Exptl. Biol. and Med., vol. 64, pages 50–54, 1947.

Gerber: Science, vol. 101, June 15, 1945, pages 616–617 relied on.

Craig et al.: J. Biol. Chem., vol. 161, 1945, pages 321–332.

Baron: "Handbook of Antibiotics," pages 247–248, published 1950 by Reinhold Publishing Corporation, New York, N.Y.

Kies et al.: J. Biol. Chem., vol. 189, April 1951, pages 637–650.